United States Patent [19]
De Marchi et al.

[11] Patent Number: 6,145,985
[45] Date of Patent: Nov. 14, 2000

[54] TEMPLE COMPRISING RIGID COMPONENTS COUPLED WITH A SOFT ELEMENT, PARTICULAR FOR EYEGLASSES

[75] Inventors: Lino De Marchi, Saonara; Sergio Menegon, Montebelluna, both of Italy

[73] Assignee: United Optical S.p.A., S. Stino di Livenza, Italy

[21] Appl. No.: 09/287,119

[22] Filed: Apr. 7, 1999

[30] Foreign Application Priority Data

Apr. 15, 1998 [IT] Italy ............................. TV98A0056

[51] Int. Cl.[7] ............................................. G02C 5/28
[52] U.S. Cl. ............................ 351/153; 351/140; 351/116
[58] Field of Search .......................... 351/111, 113, 351/114, 121, 41, 153, 140; 16/228

[56] References Cited

U.S. PATENT DOCUMENTS

| | | |
|---|---|---|
| 5,007,728 | 4/1991 | Magorien . |
| 5,059,017 | 10/1991 | Bennato . |
| 5,386,254 | 1/1995 | Kahaney . |

FOREIGN PATENT DOCUMENTS

| | | |
|---|---|---|
| 2 266 181 | 10/1975 | France . |
| 2 652 168 | 3/1991 | France . |
| 2 700 397 | 7/1994 | France . |
| 1 108 209 | 4/1968 | United Kingdom . |
| 97 21135 | 6/1997 | WIPO . |

*Primary Examiner*—Hung Xuan Dang
*Attorney, Agent, or Firm*—Guido Modiano; Albert Josif; Daniel O'Byrne

[57] ABSTRACT

A temple, for eyeglasses, comprising at least one rigid support which is associated with a front and with which at least one softer element, suitable to act as a hinge, is in turn associated.

20 Claims, 16 Drawing Sheets

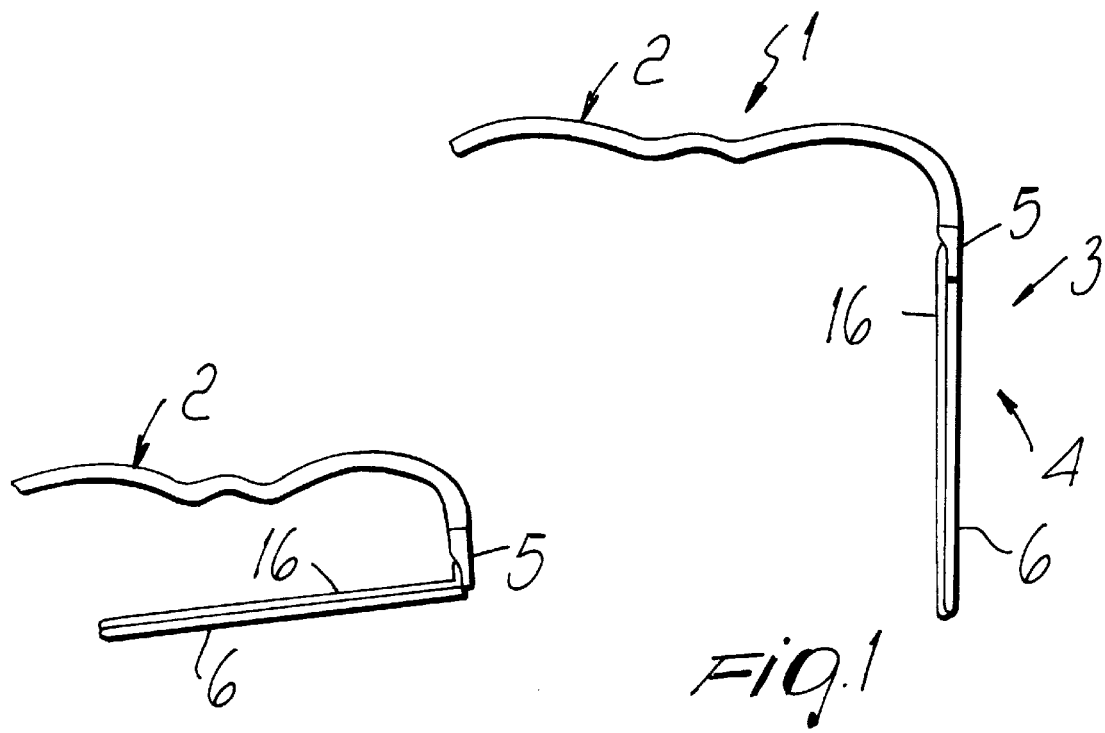
Fig. 1
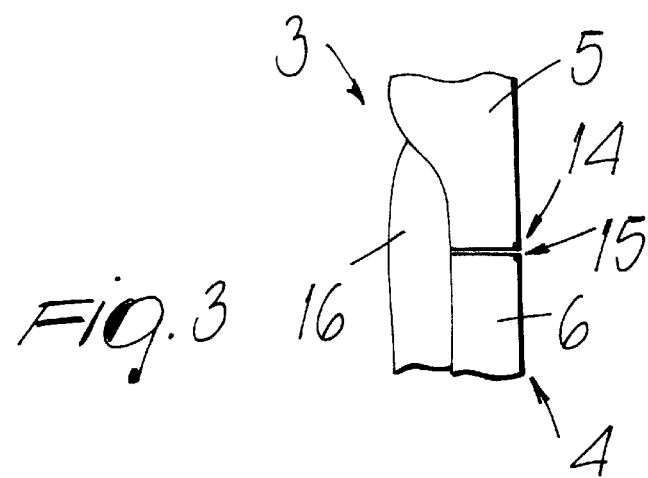
Fig. 2
Fig. 3
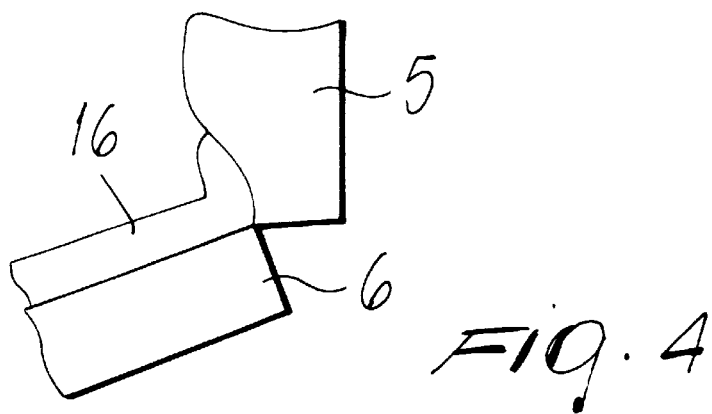
Fig. 4

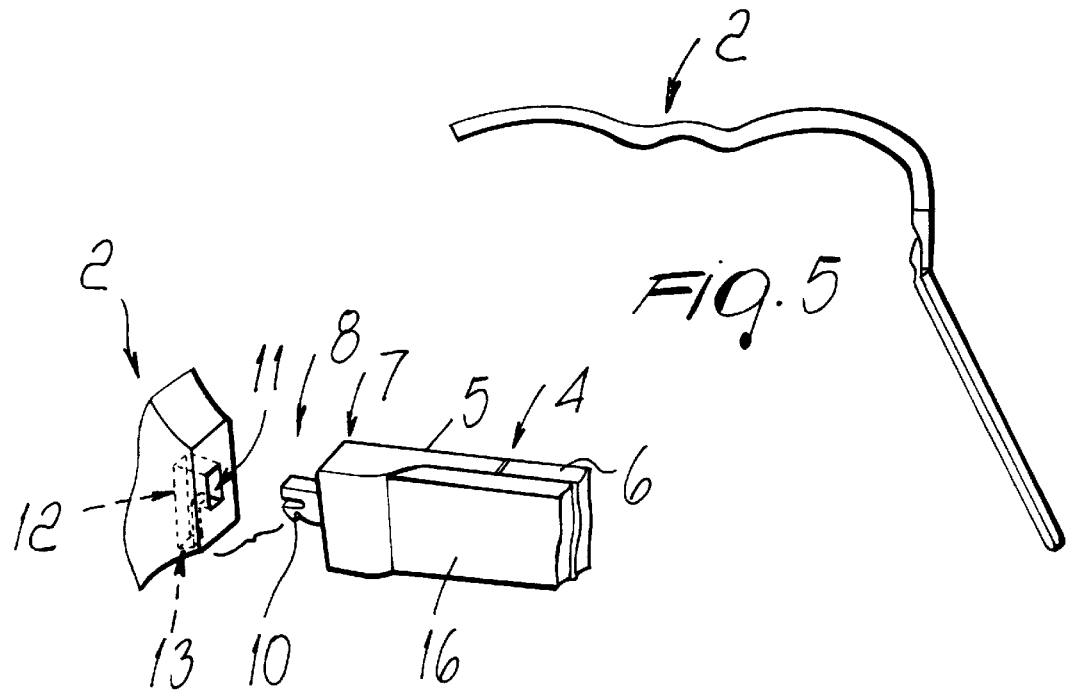
Fig. 5
Fig. 6
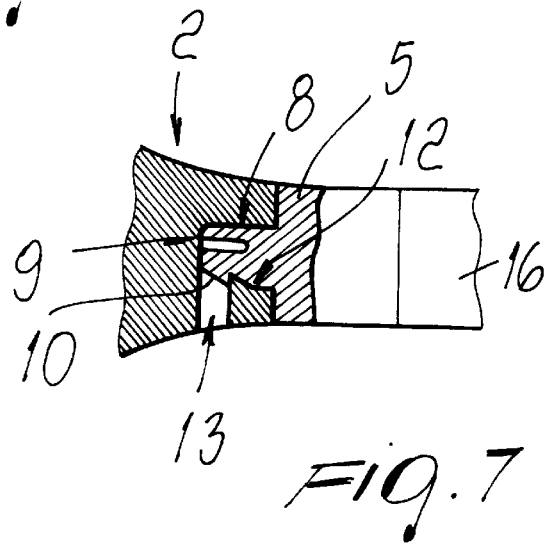
Fig. 7
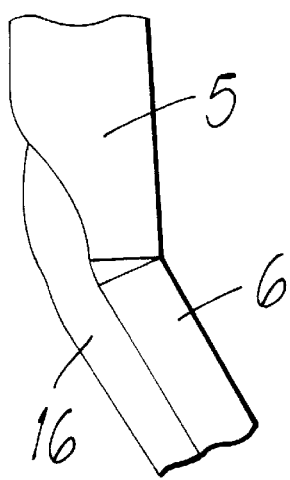
Fig. 8

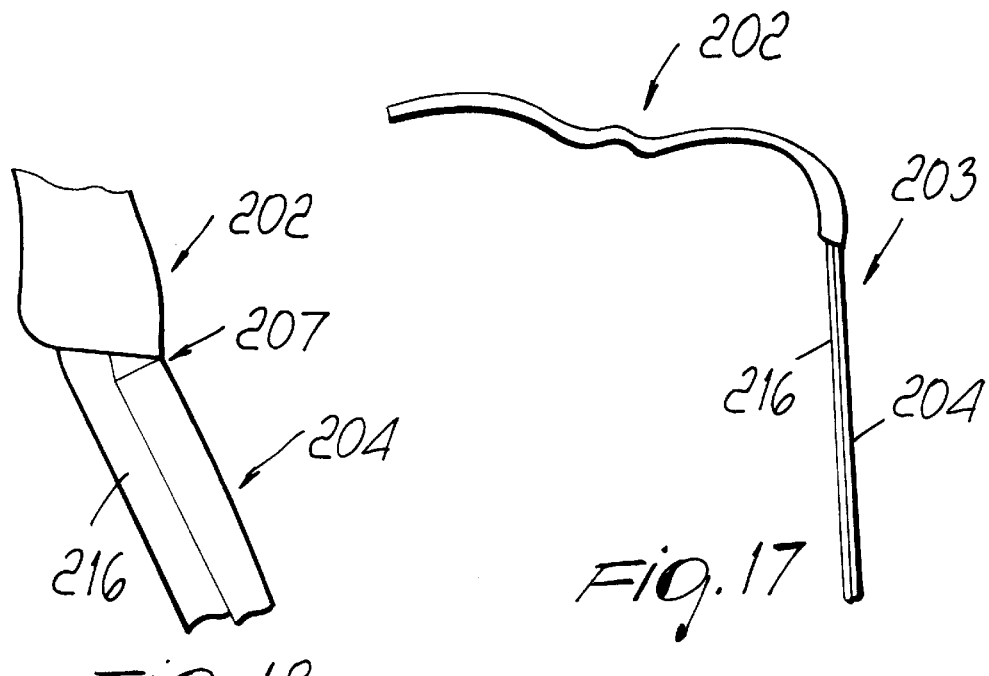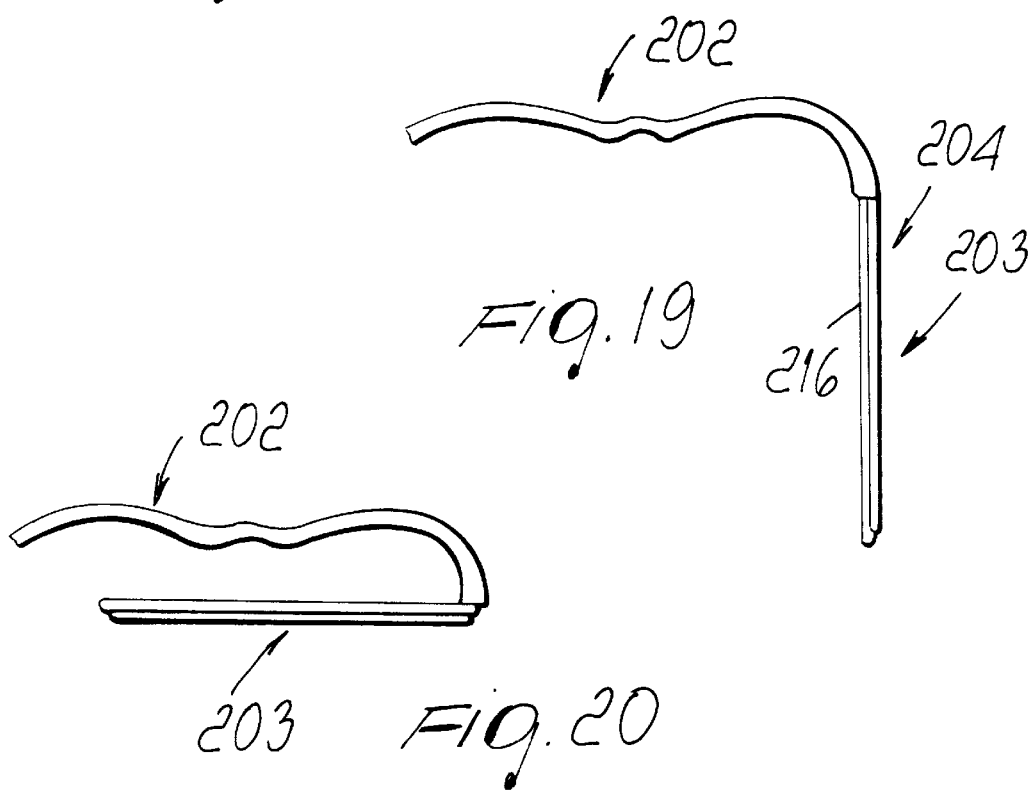

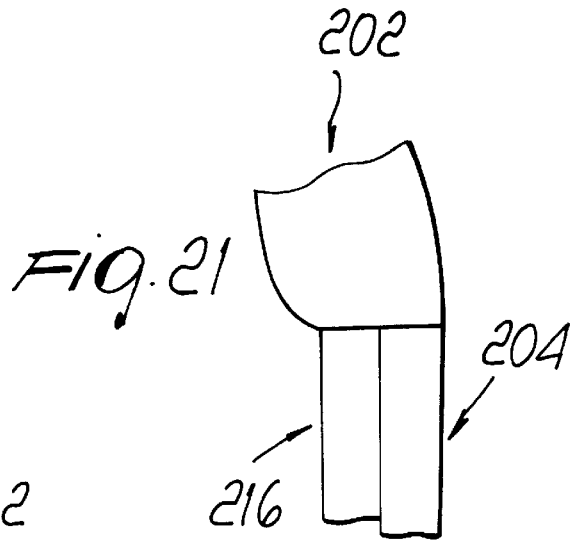
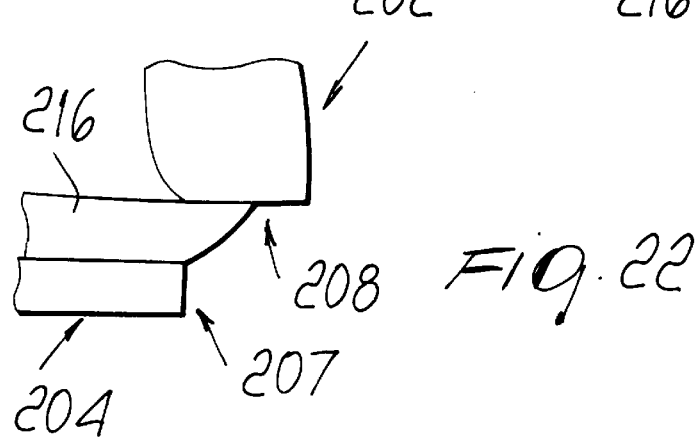
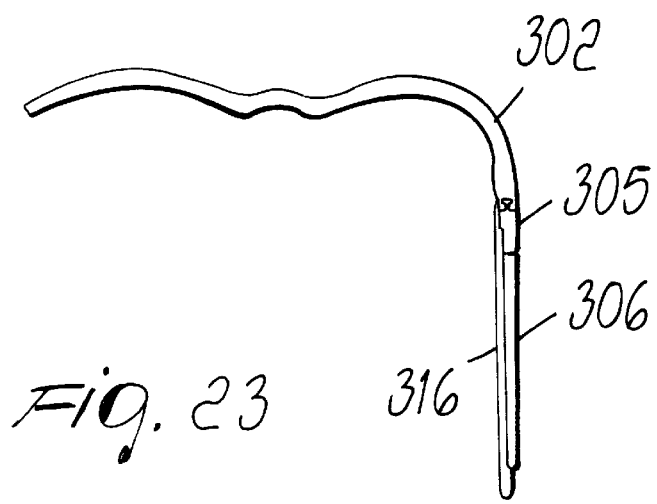

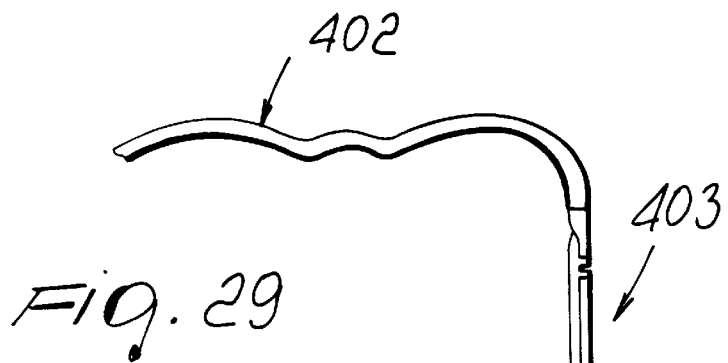
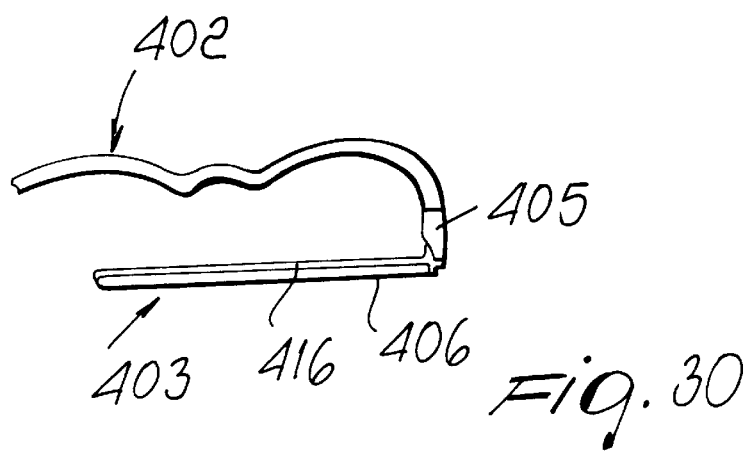
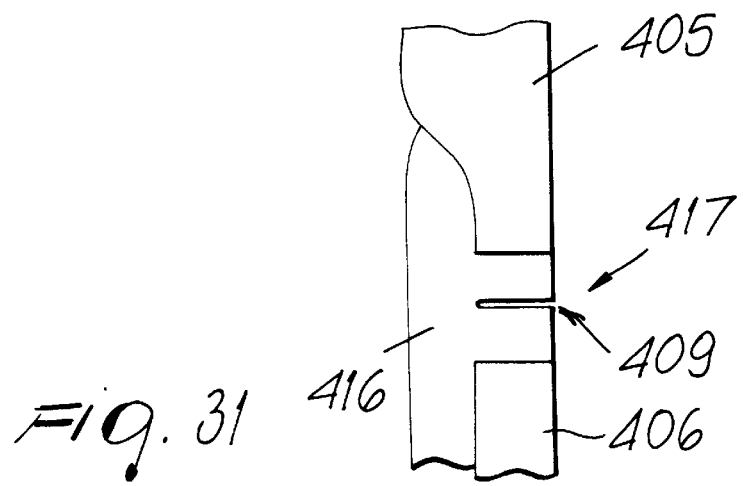

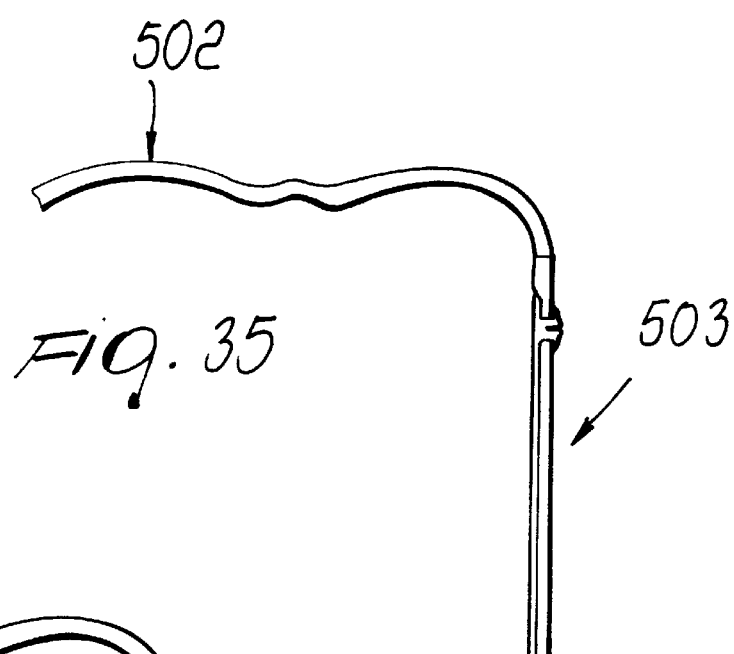
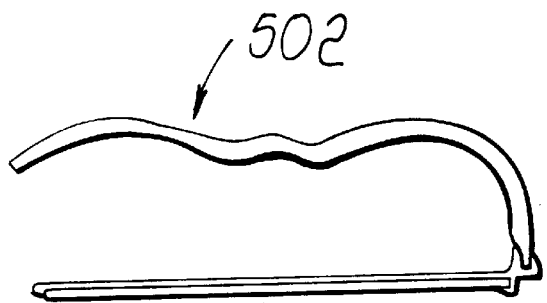
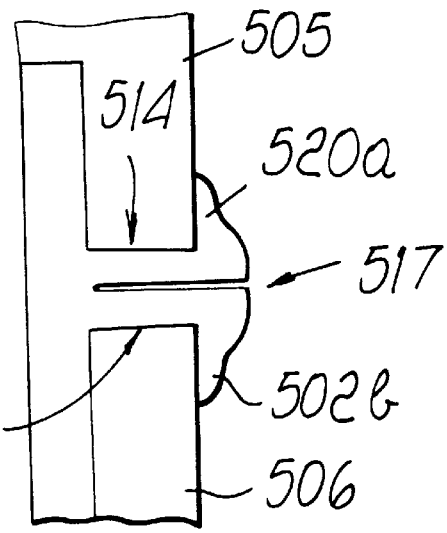

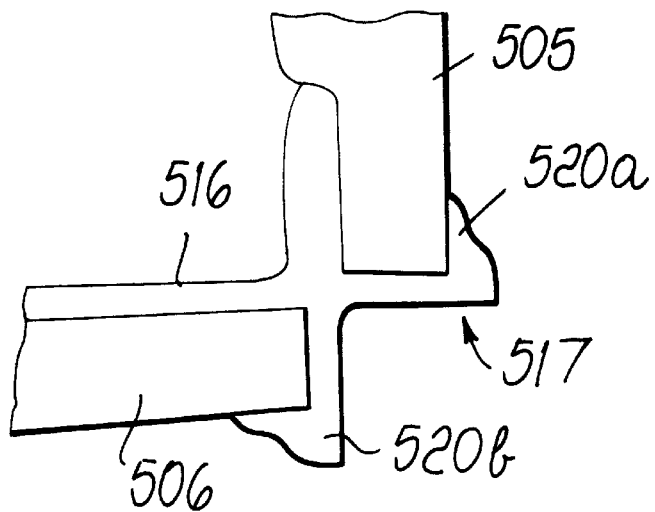
Fig. 38
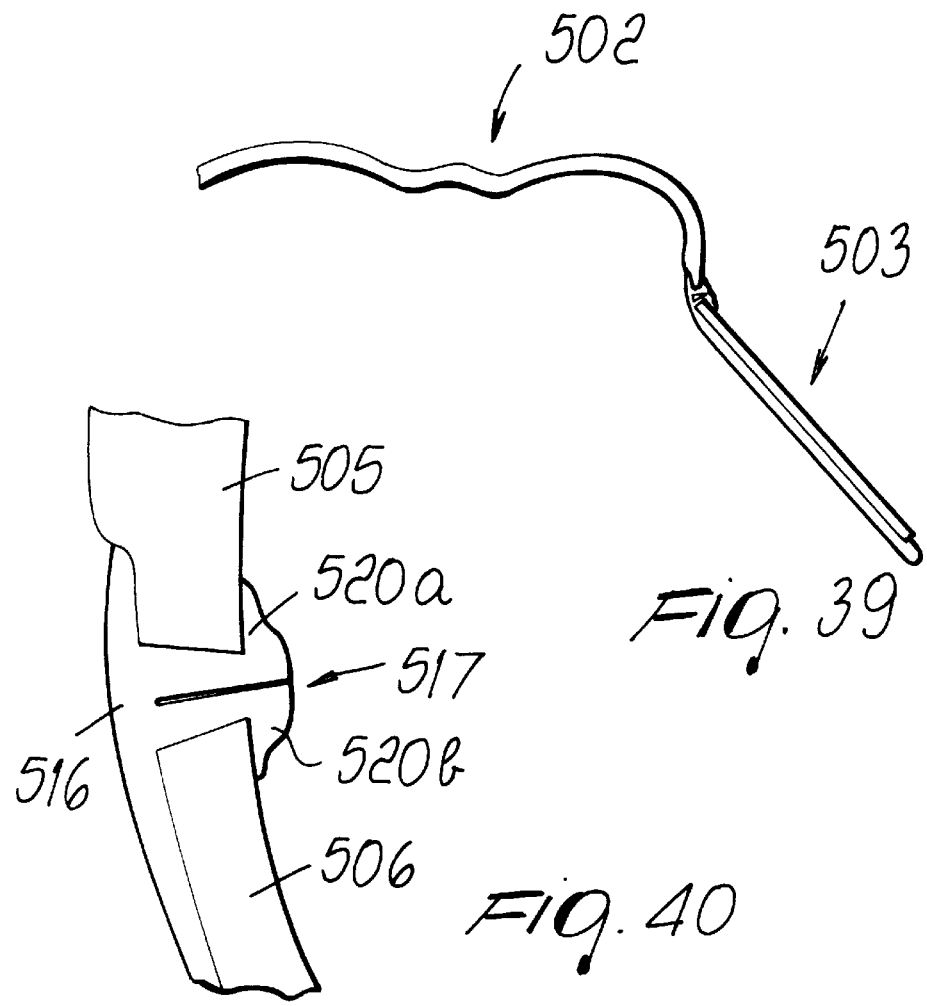
Fig. 39
Fig. 40

TEMPLE COMPRISING RIGID COMPONENTS COUPLED WITH A SOFT ELEMENT, PARTICULAR FOR EYEGLASSES

BACKGROUND OF THE INVENTION

The present invention relates to a temple for eyeglasses.

Conventional eyeglasses are currently usually constituted by a front and by a temple which are mutually connected by means of an adapted hinge.

The hinge is usually constituted by a body which has a first component associated with the front and a second component associated with the temple; the first and second components are mutually rotatably articulated by using a suitable connection pivot, which is usually constituted by a metal screw.

These conventional solutions entail problems because the screws tend to oxidize; moreover, user allergies are observed if nickel is used as a material.

Moreover, if the eyeglasses are used by children, there is the risk that they might swallow small components such as the screws, and the child might force the separation of the components of the eyeglasses and therefore of the temple from the front; it is also noted that in the case of a child the need is strongly felt to avoid, when wearing the eyeglasses, having metal parts in internal regions of the eyeglasses and particularly at the temple in the part that is adjacent to the temple region of the head, which can sometimes cause injury in case of impact.

Finally, if the eyeglasses are worn by a child, it is distinctly possible that they will be stored without too much care and therefore breakage is frequent.

As a partial solution to these drawbacks, eyeglasses for children are known which are monolithically made of flexible plastics; this solution, however, is not ideal, since in any case the temples, since they are not preformed, do not allow to wear the eyeglasses unless there are laces or elastic elements which are engaged to the tip of the temple; additionally, the characteristics of said temple allow no adjustment of the frame and therefore make it impossible to adapt it to the consumer's face.

SUMMARY OF THE INVENTION

The aim of the present invention is to solve the above-mentioned problems, eliminating the drawbacks of the cited prior art, by providing eyeglasses which have optimum fit and comfort for the user also in the case of a child.

Within the scope of this aim, an object of the present invention is to provide eyeglasses which do not have minute components which can be separated from them and might therefore be swallowed.

Another object of the present invention is to provide eyeglasses having a temple which can be temporarily connected to the front stably and easily.

Another object of the present invention is to provide eyeglasses in which the temple can be modeled according to the features of the user.

Another object of the present invention is to provide eyeglasses whose temple can be easily replaced.

A further object of the present invention is to provide eyeglasses in which an optimum hinge effect is provided between the temple and the front to allow both extra-wide opening beyond the position for normal use and folding of temples against the front.

A still further important object of the present invention is to provide eyeglasses which allow to simplify the assembly cycle.

Another object of the present invention is to provide eyeglasses which are structurally simple and have low manufacturing costs.

This aim, these objects and others which will become apparent hereinafter are achieved by a temple for eyeglasses, characterized in that it is constituted by at least one rigid support which is associated with a front and with which at least one softer element, adapted to act as a hinge, is associated.

BRIEF DESCRIPTION OF THE DRAWINGS

Further characteristics and advantages of the invention will become apparent from the following detailed description of a particular but not exclusive embodiment thereof, illustrated only by way of non-limitative example in the accompanying drawings, wherein:

FIGS. 1, 2 and 5 are top views of eyeglasses to which the temple according to the invention has been applied during normal use, temple folding and extra-wide opening respectively;

FIGS. 3, 4 and 8 are detail views of a temple according to the invention, in the conditions shown in FIGS. 1, 2 and 5;

FIG. 6 is a view of a detail of the end of the temple and of the front part to which it is to be associated;

FIG. 7 is a sectional view of the temple associated with the front;

FIGS. 19, 20, and 17 are views, similar to FIGS. 1, 2 and 5, of a third embodiment;

FIGS. 21, 22 and 18 are views, similar to FIGS. 3, 4 and 8, of the third embodiment;

FIGS. 23, 24 and 27 are views, similar to FIGS. 1, 2 and 5, of a fourth embodiment;

FIGS. 29, 30 and 33 are views, similar to FIGS. 1, 2 and 5, of a fifth embodiment;

FIGS. 31, 32 and 34 are views, similar to FIGS. 3, 4 and 8, of the fifth embodiment;

FIGS. 35, 36 and 39 are views, similar to FIGS. 1, 2 and 5, of a sixth embodiment;

FIGS. 37, 38 and 40 are views, similar to FIGS. 3, 4 and 8, of the sixth embodiment;

DESCRIPTION OF THE PREFERRED EMBODIMENTS

Figure 9:
FIGS. 9, 10 and 13 are views, similar to FIGS. 1, 2 and 6, of a second embodiment of the temple according to the invention.
Figure 10:
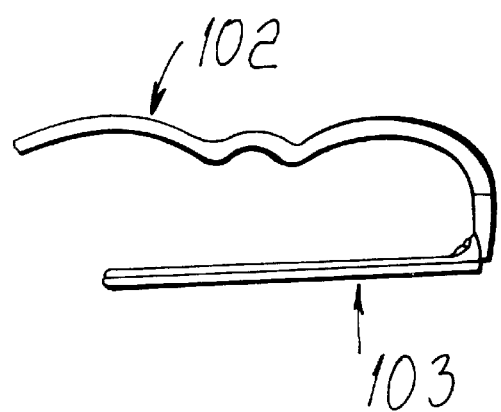
Figure 11:
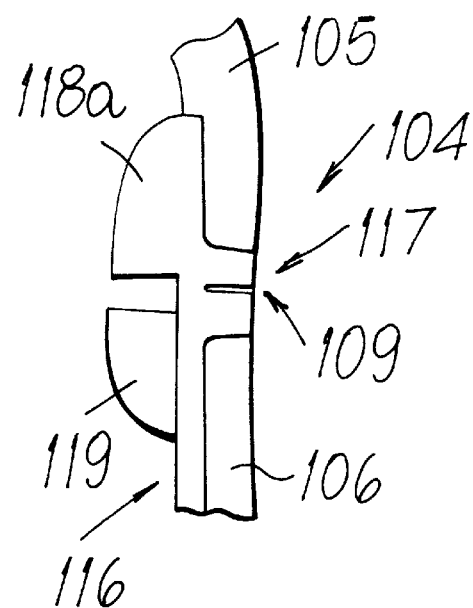
FIGS. 11, 12 and 15 are views, similar to FIGS. 3, 4 and 8, of the embodiment.
Figure 12:
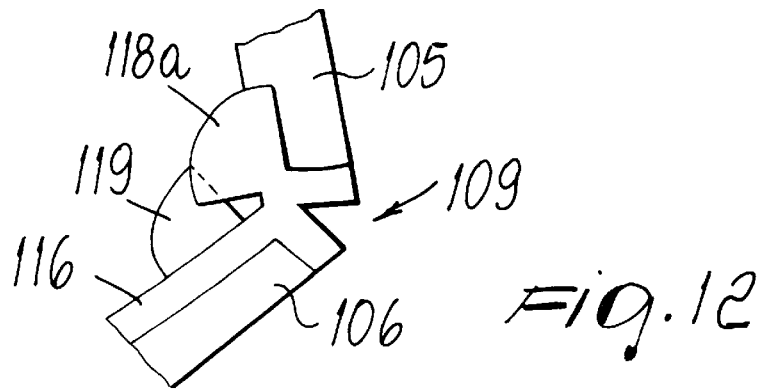
Figure 13:
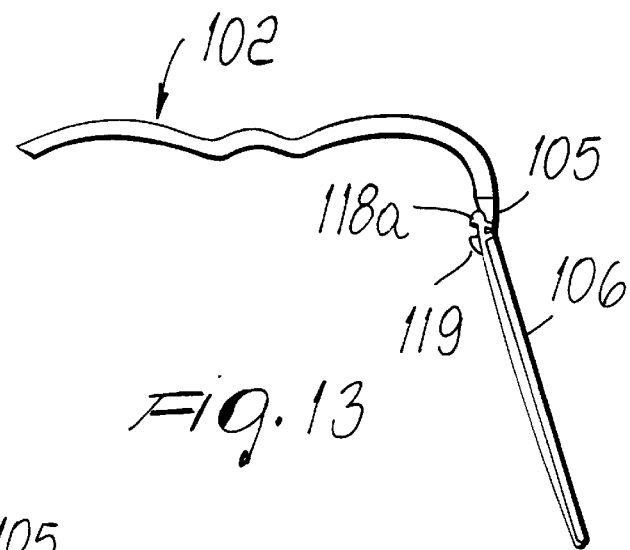
Figure 14:
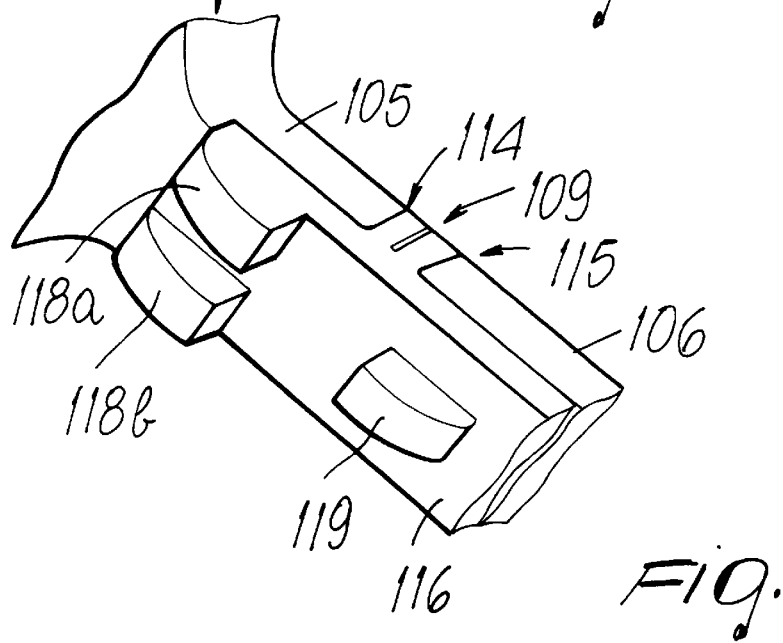
FIG. 14 is a lateral perspective view of the temple associated with the front.
Figure 15:
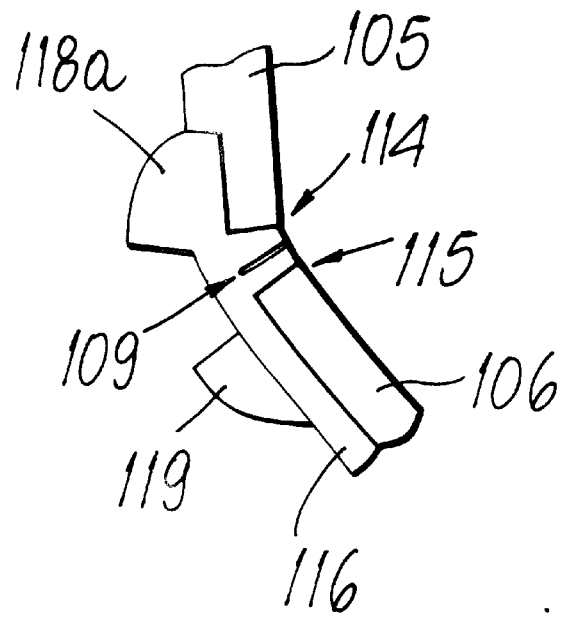

With reference to the above figures, the reference numeral 1 designates a pair of eyeglasses, shown schematically by considering a front 2 with whose ends a temple, designated by the reference numeral 3, is associable.

In the particular embodiment shown in FIGS. 1 to 8, the temple 3 is constituted by at least one rigid support 4 which is associable at the front 2.

In this embodiment, the support 4 is divided into a first component 5, which has means for temporary connection to the front 2, and into a separate second component 6, which is laterally adjacent to the preceding one and is longer so as to affect the region of the auricle of the user.

The first component 5 further has a first tip 7 which is shaped complementarily to the corresponding end of the front 2; the detachable connection means protrude from it and are constituted by a tab 8 which is substantially shaped like a parallelepiped and in which at least one axial slot 9 is defined so as to form a pair of wings, at least one of which has a tooth 10 arranged along an axis which lies transversely to the slot 9.

At the end of the front 2 there is provided a first seat 11 which is shaped complementarily to the tab 8 and therefore has a complementary tooth 12 which engages the tooth 10 during the insertion of the tab, whose wings undergo an elastic deformation, compressing during insertion and returning to the normal position once the tab has been inserted, thus allowing interaction between the complementary tooth and the tooth.

A second seat 13 is connected to the first seat 11 and is preferably formed along a perpendicular axis with respect to the axis of the first seat; seat 13 is meant to allow the access of a tool, such as for example a screwdriver, which allows to access the tooth 10 and therefore to compress the wings of the tab 8 in order to allow disengagement from the first seat 11.

The first component 5 has a second tip 14 which is laterally adjacent to a complementarily shaped third tip 15 of the second component 6, which is associated with the first component 5 by means of at least one softer element 16 which is preferably arranged at the surface that is directed toward the temple of the user's head.

Advantageously, element 16 has the same height as the first and second components, affects the entire length of the second component 6 and partially affects the length of the first component 5 up to the vicinity of the means for detachable connection to the front.

The element 16 is associated with the first and second components so that the second tip 14 and the third tip 15 approximately mate; the element 16, together with the first and second components, accordingly forms a hinge which allows to keep the temple 3 in the open condition when not in use and at the same time allows both extra-wide opening, shown in FIGS. 5 and 8, or temporary folding, shown in FIGS. 2 and 4, against the front 2.

The deformation that the element 16 undergoes in the closed or extra-wide opening conditions allows the temple 3 to return to the condition shown in FIG. 1 once the forces applied thereto have ceased.

It has thus been observed that the invention has achieved the intended aim and objects, a temple having been provided which allows to give the eyeglasses optimum fit and comfort for the user also in the case of a child.

The temple has no small components, such as screws, and therefore the eyeglasses have nothing that makes them unsuitable for use on the part of a child; moreover, the resulting hinge element is structurally simple and the temple also has good mechanical characteristics, by virtue of the presence of the rigid components, and good comfort characteristics, by virtue of the presence of the soft parts.

Comfort is further increased by the possibility to achieve extra-wide opening of the temple beyond the condition of normal use and by the possibility to fold the temples against the front.

The invention is of course susceptible of numerous modifications and variations, all of which are within the scope of the same inventive concept.

Accordingly, FIGS. 9 to 15 illustrate a second embodiment of a temple 103, which is constituted by a rigid support 104 which is again constituted by a first component 105 and by a second component 106 which are mutually separate; the first component 105 can be associated, or is associated, at an end of a front 102.

The second tip 114 of the first component 105 is spaced with respect to the third tip 115 of the second component 106 and the stem 117 of a softer element 116, suitable to act as a hinge, can be arranged in the interspace between said tips.

In this case too, the element 116 affects approximately the entire length of the second component 106 and partially affects the length of the first component 105; said stem 117 has, in the interspace between the second tip 114 and the third tip 115, an axial slot 109 which is accordingly arranged at right angles to the longitudinal axis of the first and second components; for graphic reasons the slot has been exaggerated in the drawings with respect to the real situation.

The slot 109 acts as a hinge, allowing, as shown in FIGS. 10, 12, 13 and 15, to fold the temple 103 against the front 102 or to open it extra-wide.

At the element 116 there are also provided means for guiding and temporarily locking the position of the second component 106 with respect to the first component 105; said means are constituted by two first raised portions 118a, 118b, which are formed longitudinally and to the sides of the end of the element 116 that lies above the first component 105, and by a second raised portion 119 which also protrudes from the element 116 at a region that lies above the second component 106.

The second raised portion 119 is shaped complementarily to the interspace provided between the first raised portions 118a and 118b and is arranged at a such distance from them that an initial rotation of the temple 103 to fold it against the front 102 produces a partial interaction of the second raised portion 119 in the interspace between the first raised portions 118a and 118b.

This allows to guide the temple during closure and also allows to achieve temporary locking of the rotation of the second component 106 when the second raised portion 119 abuts against the surface of the element 116 that is present between the first raised portions 118a and 118b.

This embodiment, too, achieves the intended aim and objects.

FIGS. 16 to 22 are views of a third embodiment of the temple designated by the reference numeral 203, which is again constituted by a rigid support 204 with which a softer element 216 is associated; the tip of the softer element has means for detachable connection to a front 202 which are constituted by a tab 208 which is substantially arrow-shaped and can be detachably inserted in a complementarily shaped first seat 211 formed in the front 202.

The element 216 is therefore longer than the support 204 and directly interacts with the temples of the user's head.

Once the temple has been associated with the front, the first tip 207 is arranged approximately in abutment against the front; extra-wide opening and flexing against the front 202, as shown in FIGS. 18, 20 and 22, are allowed in any case.

The distance between the first tip 207 of the support 204 and the facing surface of the front 202 is such that a chosen rotation of the temple in the extra-wide opening condition is matched by an abutment interaction between said first tip 207 and the surface of the front 202, thus constituting a stroke limiter.

This embodiment, too, has been found to achieve the intended aim and objects.

FIGS. 23 to 28 illustrate a fourth embodiment of a temple 303 which is constituted by a rigid support 304 which is in turn composed of a first component 305, provided with means for temporary connection to the front 302, and of a second component 306, which protrudes toward the auricle of the user.

The means for connection to the front are advantageously constituted by a tab 308 which has a T-shaped transverse cross-section and can be slidingly arranged at a complementarily shaped seat formed at one end of said front.

The first and second components are associated at a softer element 316 which is associated therewith so that the second tip 314 and the third tip 315 of the first and second components, respectively, are approximately mutually adjacent.

Also in this fourth embodiment, the combination of the first component and of the second component of the element 316 allows to form a hinge which in turn allows the temple to achieve both extra-wide opening and repositioning against the front 302.

This solution, too, has been found to achieve the intended aim and objects.

FIGS. 29 to 34 illustrate a fifth embodiment of a temple 403, which is constituted by a rigid support 404 which is in turn composed of a first component 405, which is associated or associable with a front 402, and of a separate second component 406.

The second tip 414 of the first component 405 and the third tip 415 of the second component 406 are mutually spaced so as to allow to insert between them the stem 417 of an element 416 which is softer than the first and second components and is adapted to act as a hinge.

An axial slot 409, exaggerated in the drawings for graphic reasons, is in fact provided at the stem 417, is arranged transversely to the first and second components, and allows, when it is opened, to position the temple 403 against the front 402 and, when it is closed, to provide extra-wide opening.

This solution, too, has been found to achieve the intended aim and objects.

FIGS. 35 to 40 illustrate a sixth embodiment of a temple 503 in which, differently from the preceding case, the stem 517 protrudes beyond the surfaces of the first component 505 and of the second component 506 which do not interact with the element 516; said stem accordingly has a substantially T-shaped transverse cross-section, whose wings 520a and 520b are variously shaped and respectively wrap around the second tip 514 of the first component 505 and the third tip 515 of the second component 506.

This solution, too, therefore allows to achieve the intended aim and objects.

FIGS. 41 to 48 illustrate a seventh embodiment of a temple 603 which is again constituted by a rigid support 604 which is in turn composed of a first component 605 and of a second component 606 which are mutually separate and are adjacent respectively at the second tip 614 and at the third tip 615.

The first and second components are mutually associated by means of a softer element 616 which is adapted to act as a hinge and is separated from the first and second components at the region of the second and third tips.

The element 616 therefore has, in the region, an arc-like shape with the concavity directed toward the temple of the user's head; this configuration allows to improve the movement conditions of the temple and therefore to achieve, in an optimum manner, both extra-wide opening and closure against the front 602.

A tab 608 is provided at, and protrudes from, the first component 605 and has, at one end, an axial slot 609 provided along a plane which is parallel to the outer lateral surface of the rigid support 604, so as to form a pair of wings; the lateral one of the wings is directed toward the temple of the user's head and has a tooth 610 suitable to temporarily engage at a complementarily shaped tooth 612 formed within a first seat 611 formed at the facing end of the front 602.

This solution, too, achieves the intended aim and objects.

The materials and the dimensions that constitute the individual components of the temple according to the present invention may of course be the most pertinent according to specific requirements.

The disclosures in Italian Patent Application No. TV98A000056 from which this application claims priority are incorporated herein by reference.

What is claimed is:

1. A temple for eyeglasses, comprising
   (a) at least one rigid support divided into a first component associated with a front of said eyeglasses and a second component arranged adjacently to said first component; and
   (b) at least one softer element extending along the length of said second component and along the length of said first component, said softer element being apt to act as a hinge between said first and second components.

2. The temple according to claim 1, wherein said first component is provided with connection means for detachably connecting it to said front.

3. The temple according to claim 2, wherein
   said first component has a first tip shaped complementarily to a corresponding end of said front;
   said connection means protrude from said tip and comprise at least one tab;
   at least one axial slot is provided on said at least one tab so as to form a pair of wings;
   at least one wing in said pair of wings has a tooth arranged along an axis which lies transversely to said slot;
   a first seat is formed on one end of said front, said seat being shaped complementarily to said tab and having a complementary tooth which selectively engages said tooth during the insertion of said tab;
   said wings in said pair of wings undergo an elastic deformation, being compressed during insertion and returning to their normal position after said tab has been inserted.

4. The temple according to claim 3, wherein a second seat is connected to said first seat and is formed along an axis perpendicular with respect to the axis of said first seat; said second seat allowing access for a tool to compress said pair of wings in order to allow uncoupling from said first seat.

5. The temple according to claim 4, wherein said first component has a second tip which is laterally adjacent to a complementarily shaped third tip of said second component, said softer element acting as a hinge being located on the side toward the temple of the user's head.

6. The temple according to claim 5, wherein said softer element has the same height as said first and second components, and extends for the entire length of said second component.

7. The temple according to claim 5, wherein said softer element is associated with said first and second components in such a manner that said second and third tips approximately mate.

8. The temple according claim 5, wherein the second tip of said first component is spaced with respect to said third tip of said second component, a stem of said softer element being arrangeable in an interspace defined therebetween.

9. The temple according to claim 8, wherein said stem has, in the interspace between said second and third tips, an axial slot which is arranged at right angles to a longitudinal axis of said first and second components and acts as a hinge.

10. The temple according to claim 9, wherein means for guiding and temporarily locking the position of said second component with respect to said first component are provided at said softer element, said means for guiding and locking being constituted by two first raised portions, which are formed longitudinally and to the sides of the end of said element that lies above said first component, and by a second raised portion, which protrudes from said softer element at a region which lies above said second component.

11. The temple according to claim 10, wherein said second raised portion is shaped complementarily to the interspace provided between said first raised portions and is arranged at a distance between the first raised portions so that an initial rotation of said temple to fold it against said front is followed by a partial engagement of said second raised portion in the interspace provided between said first raised portions.

12. The temple according to claim 11, wherein said first and second raised portions are suitable to guide said temple during closure and to achieve a temporary locking of the rotation of said second component when said second raised portion abuts against the surface of said element that is provided between said first raised portions.

13. The temple according to claim 9, wherein said stem protrudes beyond lateral surfaces of said first and second components that do not interact with said element, said stem having a T-shaped transverse cross-section, whose variously shaped ends respectively surround said second tip of said first component and said third tip of said second component.

14. The temple according to claim 5, wherein said softer element is spaced from said first and second components at the region of said second and third tips.

15. The temple according to claim 14, wherein said softer element has, at the region of said second and third tips of said first and second components, an arc-like shape in which the concavity is directed toward the temple of the user's head.

16. The temple according to claim 15, wherein a tab is provided at, and protrudes from, said first component and has, at one end, an axial slot formed along a plane which is parallel to the outer lateral surface of said rigid support, so as to form a pair of wings, the lateral one of which is directed toward the temple of the user's head and has a tooth which is suitable to temporarily engage at a complementarily shaped tooth formed within a first seat provided at the facing end of said front.

17. The temple according to claim 3, wherein said first tip of said softer element has means for detachably connecting to said front, said means for detachably connecting being constituted by an arrow-shaped tab which is detachably inserted in a complementarily shaped first seat formed in said front.

18. The temple according to claim 17, wherein said softer element is longer than said support and interacts directly with a temple of the user's head, said first tip being arranged, once said temple has been associated with said front, approximately in abutment against said front.

19. The temple according to claim 18, wherein the distance between said first tip of said support and a facing surface of said front is such that a chosen rotation of said temple in an extra-wide opening condition is matched by an abutment interaction between said first tip and said surface of said front, thus constituting a stroke limiter.

20. The temple according to claim 2, wherein said connection means for detachably connecting to said front are constituted by a tab which has a T-shaped transverse cross-section and is slidingly arranged at a complementarily shaped seat formed at one end of said front.

* * * * *

UNITED STATES PATENT AND TRADEMARK OFFICE
CERTIFICATE OF CORRECTION

PATENT NO.    : 6,145,985
DATED         : November 14, 2000
INVENTOR(S)   : Lino De Marchi, Sergio Menegon Page 1 of 1

It is certified that error appears in the above-identified patent and that said Letters Patent is hereby corrected as shown below:

<u>Title page,</u>
Item [54], TEMPLE COMPRISING RIGID COMPONENTS COUPLED WITH A SOFTER ELEMENT, PARTICULARLY FOR EYEGLASSES

Figure 16:
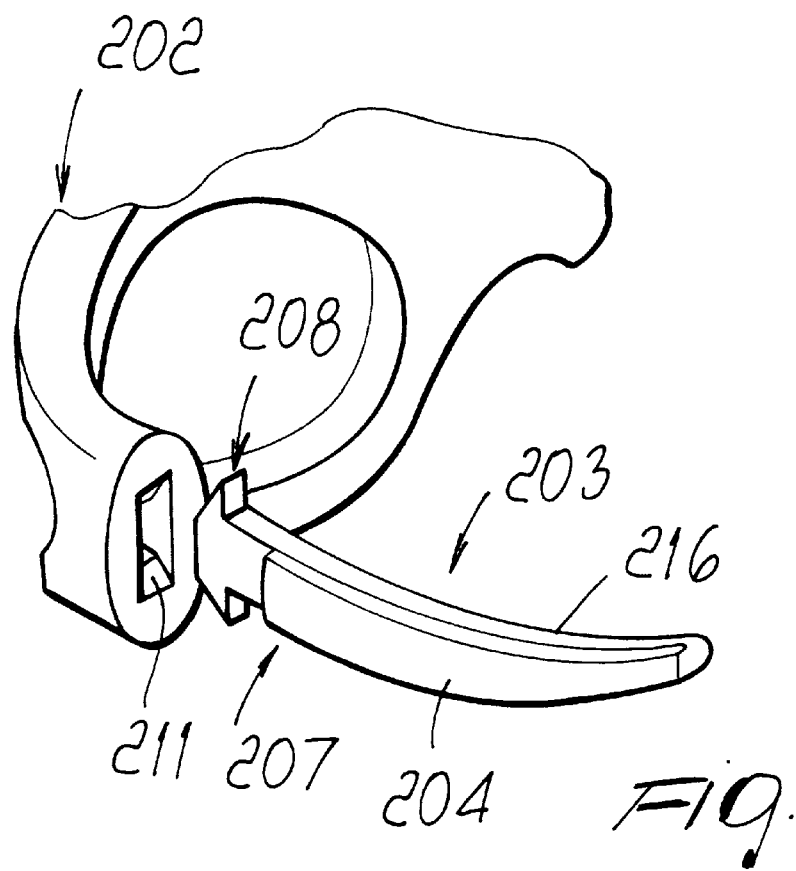
Figure 24:
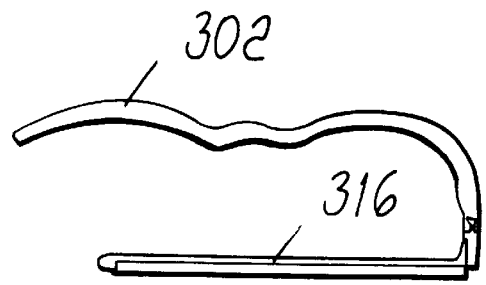
Figure 25:
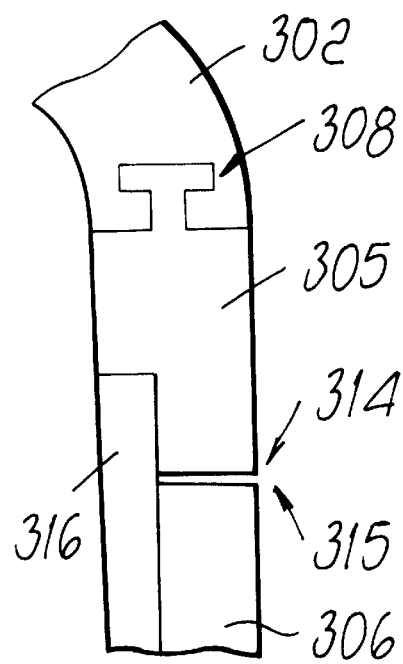
FIGS. 25, 26 and 28 are views, similar to FIGS. 3, 4 and 8, of the fourth embodiment.
Figure 26:
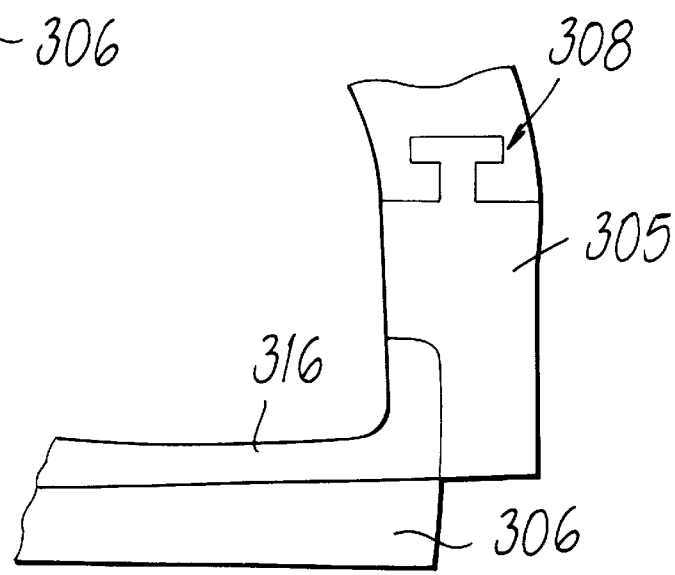
Figure 27:
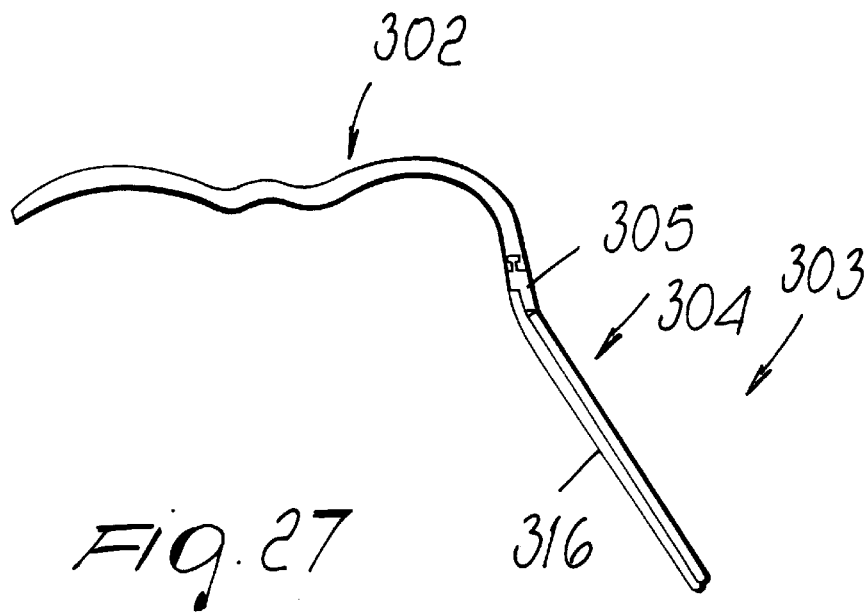
Figure 28:
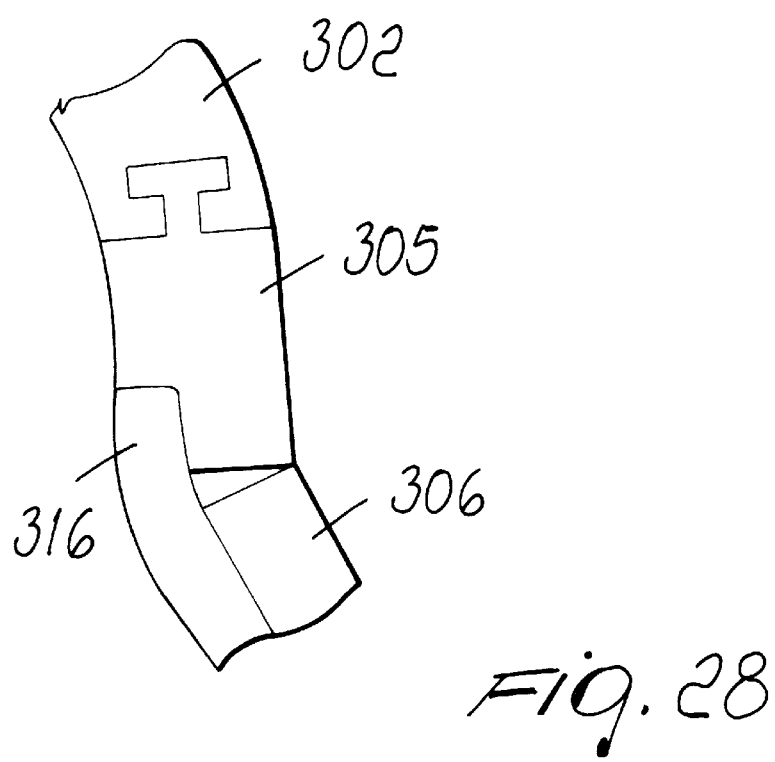
Figure 32:
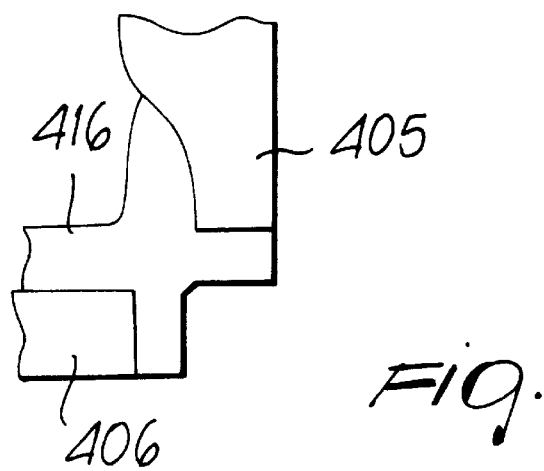
Figure 33:
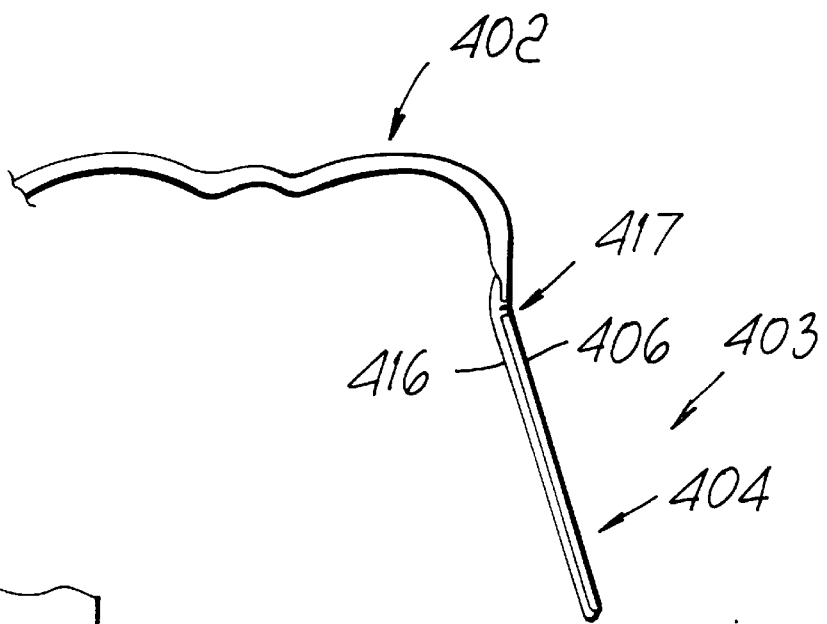
Figure 34:
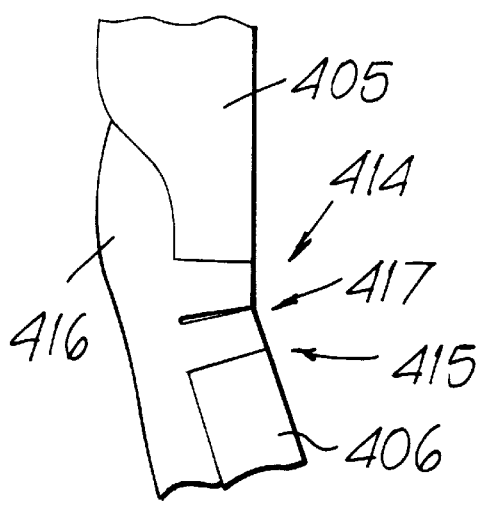
Figure 41:
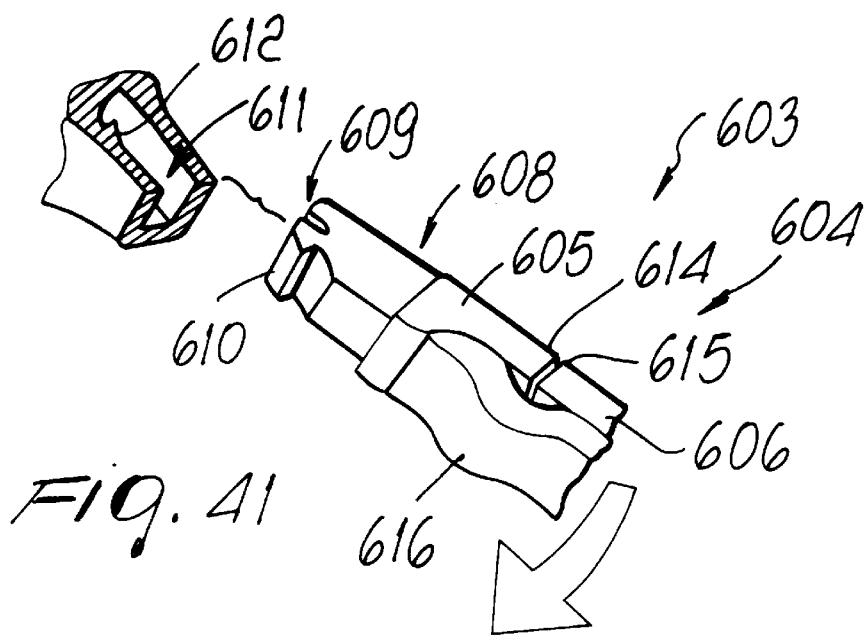
FIG. 41 is a view of the tip of the temple and of part of the front with which it is to be associated, shown in a cutout view.
Figure 42:
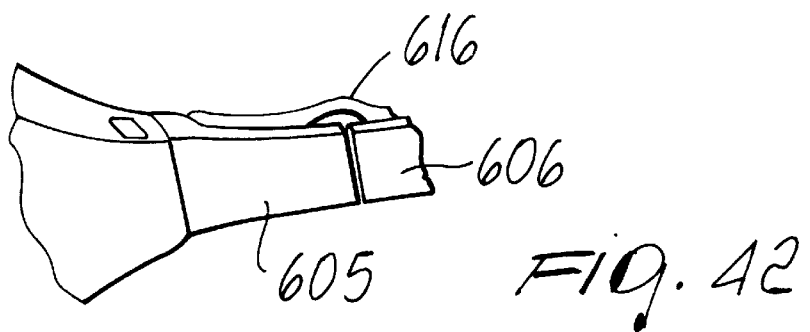
FIG. 42 is another lateral perspective view of the temple associated with the front.
Figure 43:
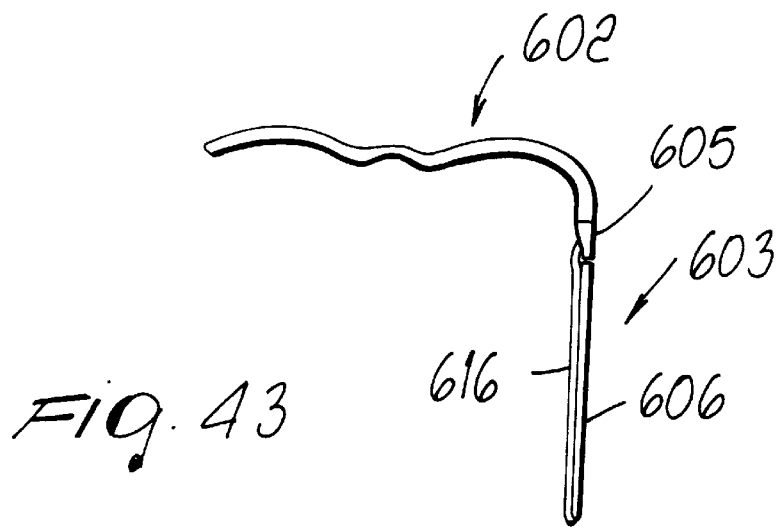
FIGS. 43, 44 and 47 are views, similar to FIGS. 1, 2 and 5, of a seventh embodiment.
Figure 44:
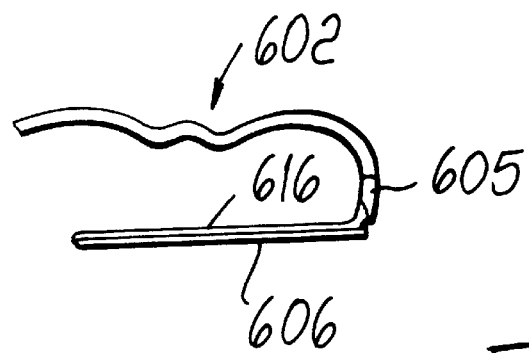
Figure 45:
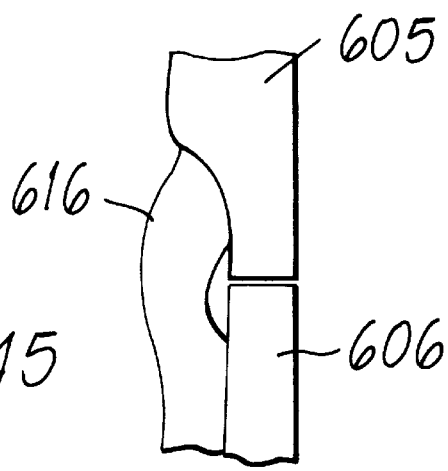
FIGS. 45, 46 and 48 are views, similar to FIGS. 3, 4 and 8, of the seventh embodiment.
Figure 46:
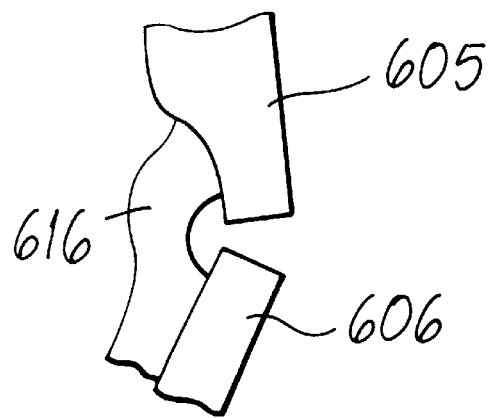
Figure 47:
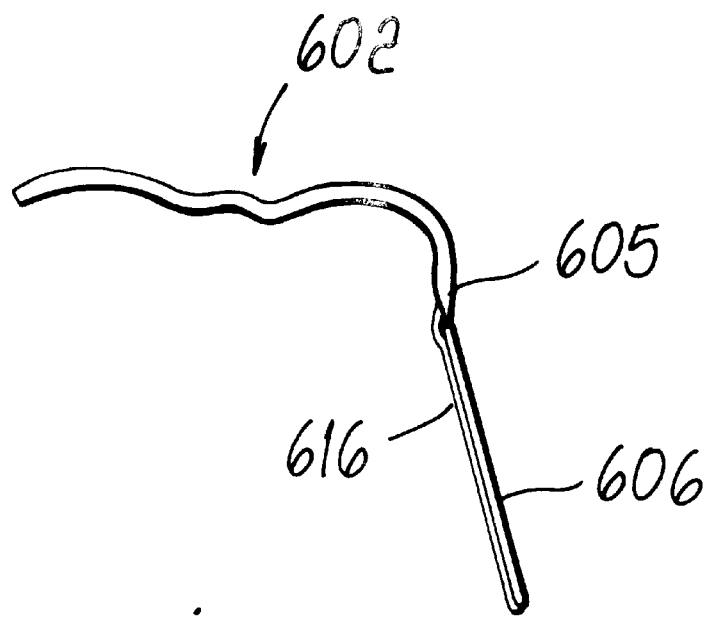
Figure 48:
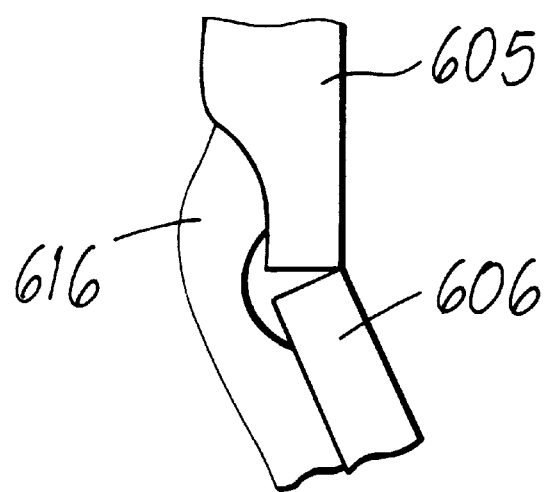

<u>Column 2,</u>
Line 37, insert -- "FIG. 16 is a perspective view of a third embodiment of the present invention, which is also illustrated in figures 17 to 22;"

Signed and Sealed this

Twenty-third Day of October, 2001

Attest:

*Nicholas P. Godici*

*Attesting Officer*

NICHOLAS P. GODICI
*Acting Director of the United States Patent and Trademark Office*